Figure 1:
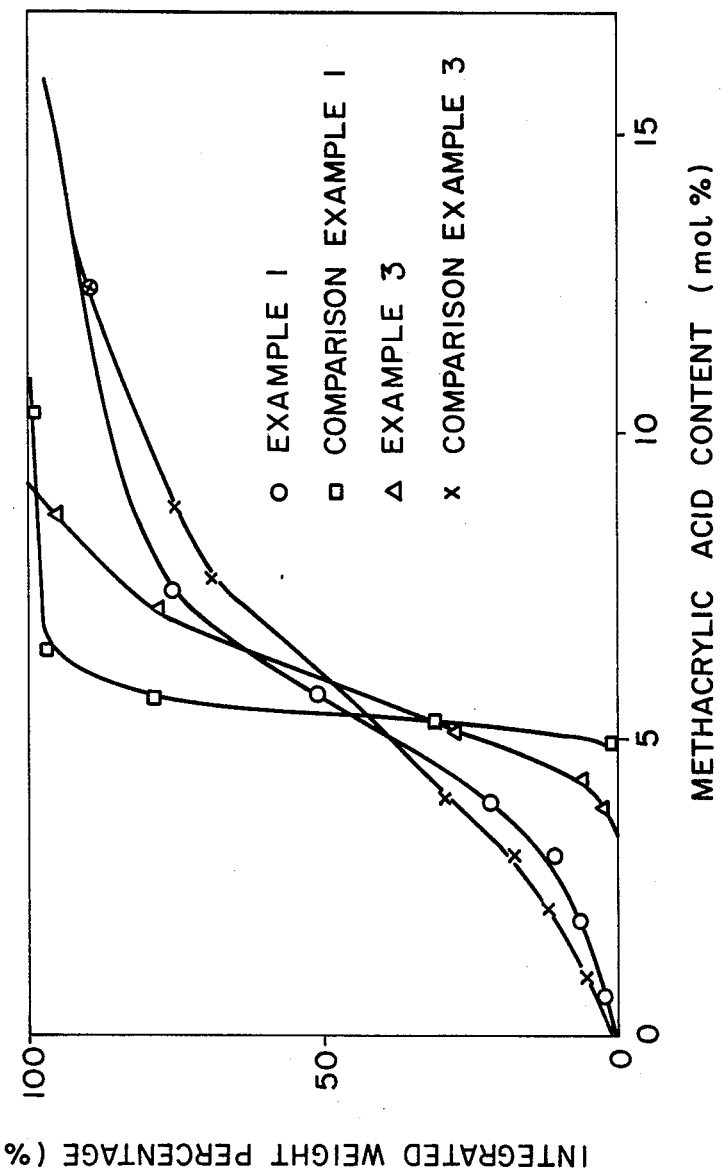

| United States Patent [19] | [11] | 4,173,669 |
|---|---|---|
| Ashida et al. | [45] | Nov. 6, 1979 |

[54] AQUEOUS DISPERSION FOR COATING AND COATED ARTICLES

[75] Inventors: Takeshi Ashida; Fumitaka Saito; Masateru Akamatsu, all of Yokohama, Japan

[73] Assignee: Asahi-Dow Limited, Tokyo, Japan

[21] Appl. No.: 832,021

[22] Filed: Sep. 9, 1977

[51] Int. Cl.$^2$ .................... C03C 17/32; C03C 25/02; C08L 33/02

[52] U.S. Cl. .............................. 428/35; 260/29.6 H; 526/240; 526/317; 525/360; 525/329

[58] Field of Search .................................. 260/29.6 H

[56] References Cited

U.S. PATENT DOCUMENTS

| 3,296,172 | 1/1967 | Funck et al. ........................ 260/34.2 |
|---|---|---|
| 3,677,989 | 7/1972 | Jenkinson ........................ 260/29.6 H |
| 3,799,901 | 3/1974 | McCann et al. ............. 260/29.6 PM |
| 4,056,653 | 11/1977 | Gebhard et al. .................... 428/35 X |
| 4,135,014 | 1/1979 | Salensky et al. ........................ 428/35 |

*Primary Examiner*—Sandra M. Person
*Attorney, Agent, or Firm*—Armstrong, Nikaido, Marmelstein & Kubovcik

[57] ABSTRACT

An aqueous dispersion of partially neutralized ethylene/$\alpha,\beta$-ethylenically unsaturated carboxylic acid copolymer having a specific composition distribution of the acidic units is found to have an excellent film-forming property and suitable for coating of various substrates. Articles coated with said aqueous dispersion are improved in various properties such as heat-sealability, oil resistance, water resistance, adhesiveness and so on.

19 Claims, 3 Drawing Figures

AQUEOUS DISPERSION FOR COATING AND COATED ARTICLES

This invention relates to an aqueous dispersion for coating. More particularly, this invention relates to an aqueous dispersion for coating of an ethylenic copolymer having excellent film-forming property.

Partially neutralized ethylene/α,β-ethylenically unsaturated carboxylic acid copolymer, which contains carboxylic acid groups in the molecular chain, is known to be excellent in adhesion to various substrates. It is also known to coat various substrates by using an aqueous dispersion of said copolymer, as disclosed by U.S. Pat. Nos. 3,296,172 and 3,677,989. These aqueous dispersions, however, had the drawback of extremely poor film-forming property. Namely, when said aqueous dispersion is coated on a substrate to form a dried film through evaporation of water, cracks will frequently occur on the film. Formation of a film even at a considerably high temperature will fail to produce a good continuous film. Thus, inherent properties of said copolymer such as good oil resistance, water resistance, toughness, adhesiveness, heat-seal property, etc. cannot be exhibited in practical application.

The present inventors have made extensive studies to overcome the drawbacks of prior art as mentioned above. As the result, it has now been found that an aqueous dispersion of a partially neutralized ethylene/α,β-ethylenically unsaturated carboxylic acid copolymer is suitable for coating various substrates, only when said copolymer has a specific composition distribution.

The present invention provides an aqueous dispersion for coating comprising a partially neutralized copolymer comprising from 99 to 75 mol %, preferably from 98 to 90 mol % of ethylene and from 1 to 25 mol %, preferably from 2 to 10 mol % of α,β-ethylenically unsaturated carboxylic acid, of which at least 10% (up to 100%) is neutralized with metallic and/or ammonium ions, wherein the improvement comprises using the copolymer having a composition distribution of acidic units within the range from 0.50 to 0.95, preferably from 0.60 to 0.90 in terms of the ratio of the reciprocal of the minus first-order moment to the plus first-order moment of the distribution of the acidic units. The "acidic units" herein means comprehensively both free carboxylic acid groups and carboxylate groups in the form of neutralized salts.

The reciprocal of the minus first-order moment $\bar{C}_n$ and the plus first-order moment $\bar{C}_w$ of the distribution of the acidic units are defined by the following formulas, respectively:

$$\bar{C}_n = \left[ \sum_{i=1}^{n} W_i C_i^{-1} \right]^{-1} \quad (1)$$

$$\bar{C}_w = \sum_{i=1}^{n} W_i C_i \quad (2)$$

wherein n represents the number of fractions in composition fractionation of the copolymer; $W_i$ the weight ratio of the i'th fraction; and $C_i$ the molar ratio of the acidic units in said fraction, the number n being 7.

The content of the acidic units in said copolymer, is limited from standpoint of the properties of the copolymer. If it is less than 1 mol %, there is no effect of copolymerization. On the other hand, with content of higher than 25 mol %, water resistance, and other properties are extremely lowered. Most favorable properties are obtained with a content in the range from 2 to 10 mol %.

The copolymer with a ratio of $\bar{C}_n/\bar{C}_w$ higher than 0.95 is very narrow in distribution of the acidic units to be highly homogeneous in composition and fails to exhibit excellent film-forming property as in the present invention. On the other hand, with a ratio of $\bar{C}_n/\bar{C}_w$ lower than 0.50, the distribution of the acidic units is too broad, and the composition is extremely inhomogeneous to cause phase separation, whereby no favorable result can be obtained.

The above composition distribution of the acidic units is determined by fractionation of the copolymer. The principle of fractionation is based on the difference in solubility of the two components of the copolymer in solvents. The polymer to be fractionated is first deposited on the silica-support in the column, and then eluted successively by a series of mixed solvents of which solvent power is successively changed. The partially neutralized copolymer is first converted with excess amount of acid into ethylene/α,β-ethylenically unsaturatedcarboxylic acid copolymer. This copolymer which however is low in thermal stability is then usually converted with methanol and sulfuric acid into the corresponding ethylene/α,β-ethylenically unsaturated carboxylic acid methyl ester copolymer before it is subjected to fractionation by elution through a column with p-xylene/2-ethoxyethanol system, according to the same method as described in U.S. Pat. No. 3,350,372 except that fractionation is performed with seven fractions by varying the relative volume of p-xylene/2-ethoxyethanol at ratios of 0:100, 30:70, 50:50, 60:40, 65:35, 70:30 and 100:0. When an ethylene/α,β-ethylenically unsaturated carboxylic acid ester is used as starting material, the composition distribution of the acidic units can be determined directly by the above method.

Figure 2:
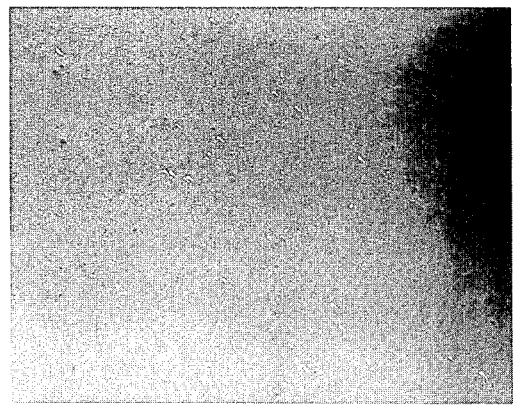
Figure 3:
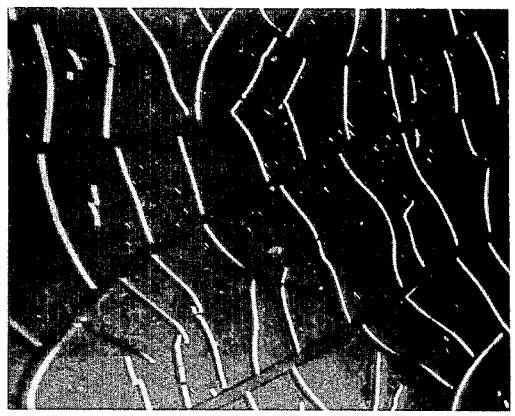

In the accompanying drawings, FIG. 1 shows integrated composition distribution curves of the copolymers obtained in Example 1, Comparison example 1, Example 3 and Comparison example 3, as hereinafter described, said integrated composition distribution curves being obtained by plotting $$( \sum_{j=1}^{i-1} W_j + \frac{1}{2} W_i )$$

versus $C_i$ wherein $W_i$ and $W_j$ present weight ratios of i'th and j'th fractions, respectively and $C_i$ the composition of i'th fraction; FIG. 2 and FIG. 3 are microphotographs (magnification ×10) showing the states of films obtained by drying at 150° C. the aqueous dispersions obtained in Example 1 and Comparison example 2 as hereinafter described, respectively.

Examples of α,β-unsaturated carboxylic acid are acrylic acid, methacrylic acid, fumaric acid, itaconic acid, maleic acid, and the like. Furthermore, in addition to said acid components, unsaturated carboxylic acid alkyl esters such as methyl acrylate, methyl methacrylate or vinyl esters such as vinyl acetate may also be contained.

An aqueous dispersion of partially neutralized ethylene/α,β-ethylenically unsaturated carboxylic acid copolymer can be prepared from ethylene/α,β-ethylenically unsaturated carboxylic acid copolymer or ethylene/α,β-ethylenically unsaturated carboxylic acid alkyl ester ($C_1$-$C_8$) (which is hereinafter referred to as 'base copolymer') according to the methods as disclosed in Belgium Patent No. 695,197, U.S. Pat. Nos. 3,677,989, 3,296,172 or other known methods for preparation of neutralized aqueous dispersions.

For example, according to a preferable method, the aqueous dispersion of this invention is prepared by adding the partially neutralized ethylene/α,β-ethylenically unsaturated carboxylic acid copolymer into water at a concentration of 10 to 60 wt. % and heating the mixture at 120° C. or higher under stirring. Alternatively, according to another preferable method, the aqueous dispersion can be prepared by heating ethylene/α,β-ethylenically unsaturated carboxylic acid copolymer in an alkaline aqueous solution. In these methods of preparing self-emulsifying aqueous dispersion, the copolymer having the specific composition distribution of the acidic units of the present invention is most preferable. Furthermore these methods are simple to a great commercial advantage. It is required to neutralize at least 10% of α, β-ethylenically unsaturated carboxylic acid in said aqueous dispersion with metallic or/and ammonium ions. Examples of metallic ions to be used for neutralization are those of alkali metals such as sodium, potassium, lithium. A part of the acid may be neutralized with organic amines, if desired.

The amount of metallic and/or ammonium ions used for neutralization is limited within the aforesaid range from standpoint of stability of the aqueous dispersion or favorable physical properties such as mechanical or oil resistance properties of the film prepared from said aqueous dispersion.

Such a base copolymer with a specific composition distribution of the acidic units can be prepared by utilizing conventional polymerization technique for production of high pressure polyethylene. The composition distribution of the acidic units of the copolymer can be varied by varying polymerization conditions, the type of the reactor, feeding ratio of monomers, the reaction temperature, the pressure, the amount of catalyst, etc. According to a typical procedure, the base copolymer to be used in the present invention can be prepared by feeding ethylene and 0.1 to 5% by weight (based on the weight of ethylene) of α,β-ethylenically unsaturated carboxylic acid or an alkyl ester thereof into a slender tubular reactor having a length necessary for conversion of 5 to 25% based on the total weight of ethylene and α,β-ethylenically unsaturated carboxylic acid or the total weight of ethylene and α,β-ethylenically unsaturated carboxylic acid alkyl esters having a ratio of length to diameter from 250:1 to 30,000:1, and then polymerizing the monomers at a temperature of 150° to 300° C., under a pressure of 1,500 to 3,000 kg/cm$^2$ in the presence of oxygen or a free radical catalyst. And if necessary, as described in U.S. Pat. No. 3,334,081, monomers are fed through the feeding points put along the tubular reactor. In the present invention, however, the method for preparation of the base copolymer is not limited in any way but various procedures known in the art are available, for example, preparation method with a multistage autoclave as described by British Patent No. 965,838 or other methods for preparation of high pressure polyethylene polymers.

The base copolymer should preferably have a melt index of from 1 to 100 g/10 minutes in case of ethylene/α,β-ethylenically unsaturated carboxylic acid and of from 5 to 300 g/10 minutes in case of ethylene/α,β-ethylenically unsaturated carboxylic acid alkyl ester.

The thus obtained aqueous dispersion of partially neutralized ethylene/α,β-ethylenically unsaturated carboxylicacid copolymer having a specific composition distribution of the acidic units exhibits excellent film-forming property. Namely, when said aqueous dispersion is coated on a substrate and dried to form a film on the substrate, there can be formed a film with no crack at a relatively low drying temperature. Such an effect is entirely unexpected from the state of prior art. Conventionally, as described in U.S. Pat. No. 3,677,989, it has been accepted that a preferred copolymer for an aqueous dispersion is one in which each polymer macromolecule must contain substantially the same proportions of polymerized comonomer as the other macromolecules, (i.e., the value of $\overline{C}_n/\overline{C}_w$ as defined in the present invention is substantially equal to 1.0). In the light of such a generally accepted recognition, it is entirely surprising that the copolymer having a specific broad composition distribution of the acidic units of the present invention has such an excellent film-forming property.

The aqueous dispersion of ethylenic copolymer having excellent film-forming property is particularly suitable for coating of various substrates. Examples of substrates are metals such as aluminum, chromium, iron, etc.; inorganic materials such as glasses, ceramics, clays, calcium sulfate, calcium carbonate, etc.; thermosetting polymers such as phenol resins, melamine resins, epoxy resins, etc.; thermoplastic polymers such as styrene resins, polyester, polyurethane, polyacetal, polyamide, polyethylene, polypropylene, etc.; proteinous materials such as leather, fur, gelatin, etc.; natural fibers such as cotton, silk, wool, etc.; cellulosic materials such as paper, wood, cellophanes, etc.; and natural or synthetic rubbers. These substrates may be shaped in films, sheets, bottles, powders, granules, fibers, ropes, fabrics, unwoven fabrics, porous or non-porous shapes, etc.

Particularly suitable applications are coatings of papers, cellulosic material (e.g. ethyl cellulose, cellulose acetate, cellulose propionate, cellulose acetate butyrate, cellulose nitrate, etc.) or aluminum foils or cans and coatings of films, sheets, bottles or tubes of synthetic resins such as polyamide, polyvinylalcohol, polyvinyl chloride, polystyrene, polyvinylidene chloride, polypropylene, polyethylene, polyester, etc. By such coatings, these substrates are endowed with oil resistance, heat seal property and adhesiveness to other substrates. In application of such coatings, adhesives such as of isocyanate type, imine type, chlorinated polyolefin type, organic titanate type, etc. may also be used, if desired, for increasing adhesion of coating onto substrates. Coating of glass fibers, talc or calcium carbonate will impart sheafing property to these materials. Further, when the thus coated materials are used as fillers in synthetic polymers, adhesion property of filler/polymer interface can be improved to give composite materials having excellent properties. If necessary, organic silane coupling agents may also be used in combination. Typical examples of organic silane coupling agents are silanes containing two or three readily hydrolyzable groups such as -OOR, or -OR (wherein R represents an alkyl or a cycloalkyl having 1 to 8 carbon atoms), including commercially available organic silanes such as chloropropyl trimethoxy silane, γ-aminopropyl triethoxy silane, γ-methacryloxypropyl trimethoxy silane, vinyl trimethoxy silane, and so on. Adhesiveness is also imparted by coating natural or synthetic fibers. Coating of a glass bottle or a glass plate will prevent glass pieces from scattering when it is bursted. The uses of the aqueous dispersion is not limited to those as mentioned above.

The present invention is described in further detail by referring to the following Examples, which are set forth for not limiting but only illustrative purpose.

EXAMPLE 1

Into a tubular reactor with diameter of 4.8 mm and length of 20 m were fed 13 kg/hour of ethylene. 0.28 kg/hour of methyl methacrylate and 20 ppm (based on ethylene) of oxygen as catalyst. Polymerization was carried out at a temperature of 220° C. under pressure of 2500 kg/cm$^2$ to conversion of 12% based on the total weight of ethylene and methyl methacrylate. The resultant ethylene/methyl methacrylate copolymer contained 5.7 mol % of methyl methacrylate and had a melt index of 90 g/10 min. (ASTM-D-1238). Composition fractionation of this copolymer by column elution method gives the value $\overline{C}_n/\overline{C}_w$ of 0.61. The curve of integrated composition distribution of the acidic units of this copolymer is shown in FIG. 1.

Fifty grams of this copolymer, 90 g of benzene, 20 g of methanol and 12.8 g of caustic soda were dissolved in a pressure glass tube at 120° C. to carry out the reaction for 2 hours. After completion of the reaction, the temperature of the reaction mixture was lowered to 80° C. and 28.5 g of 50 wt. % of sulfuric acid was added to the mixture for removal of sodium. The reaction product was separated by precipitation. The resultant cake was washed with water and dried after recovery of the solvent to obtain partially neutralized ethylene/methacrylic acid copolymer in which 36% of methacrylic acid was neutralized with sodium ions. Forty grams of this copolymer and 120 g of water were introduced to a pressure vessel and stirred at 140° C. for 3 hours to obtain an aqueous dispersion. Stirring was performed by means of propeller type stirring blade at 1000 r.p.m. The resultant aqueous dispersion had a solid content of 2%, viscosity of 25 c.p. measured by a Brookfield viscometer at 25° C. and average diameter of 0.3 micron.

EXAMPLE 2

Example 1 was repeated except that 13.0 kg/hour of ethylene, 0.23 kg/hour of methyl methacrylate were used and conversion based on the total weight of ethylene and methyl methacrylate was 10%, to prepare ethylene/methyl methacrylate copolymer containing 5.8 mol % of methyl methacrylate with $\overline{C}_n/\overline{C}_w$ of 0.85 and a melt index of 85 g/10 min. Then, according to the same method as in Example 1 except that 12.9 g of caustic soda and 28.5 g of 50 wt. % sulfuric acid were used, an aqueous dispersion in which 32% of methacrylic acid was neuttalized with sodium ions with solid components of 24%, viscosity of 35 c.p. and average particle diameter of 0.3 microns was obtained.

EXAMPLE 3

According to the same procedure as described in Example 1 except that 13.0 kg/hour of ethylene and 0.19kg/hour of methyl methacrylate were used and the conversion based on the total weight of ethylene and methyl methacrylate was 8%, there was obtained ethylene/methacrylate copolymer containing 5.8 mol % of methyl methacrylate, $\overline{C}_n/\overline{C}_w=0.92$, and melt index of 60 g/10 min. Then, similarly as described in Example 1, using 12.9 g of caustic soda added and 28.6 g of 50 wt. % sulfuric acid, there was obtained an aqueous dispersion in which 29% of methacrylic acid was neutralized with sodium ions with solid content of 22%, viscosity of 40 c.p. and average particle diameter of 0.3 micron.

EXAMPLE 4

Example 1 was repeated except that 13.0 kg/hour of ethylene, 0.4 kg/hour of methyl methacrylate were used and the conversion based on the total weight of ethylene and methyl methacrylate was 10% to obtain an ethylene/methyl methacrylate copolymer containing 9.7 mol % of methyl methacrylate with $\overline{C}_n/\overline{C}_w$ of 0.85 and melt index of 130 g/10 min. Then, according to the same procedure as in Example 1 except that the amount of caustic soda added was 15.0 g and that of 50 wt. % sulfuric acid 32.8 g, there was prepared ethylene/methacrylic acid partially neutralized copolymer in which 32% of methacrylic acid was neutralized with sodium ions. Then, according to the same method as in Example 1 an aqueous dispersion was obtained. The resultant aqueous dispersion had a solid content of 24%, viscosity of 25 c.p. and average particle diameter of 0.3 micron.

EXAMPLE 5

Using 50 g of ethylene/methyl methacrylate copolymer obtained in Example 1, 10.7 g of caustic soda and 26.3 g of 50 wt. % sulfuric acid, ethylene/methacrylic acid copolymer was prepared. Then, an aqueous dispersion of this copolymer was prepared according to the same method as disclosed by U.S. Pat. No. 3,296,172. This aqueous dispersion, in which 30% of methacrylic acid was neutralized with sodium ions, had a solid content of 25%, a visicosity of 30 c.p. and an average particle diameter of 0.3 micron. The aqueous dispersion contained 4.8% (based on solid components) of sodium oleate.

EXAMPLE 6

Using the ethylene/methacrylic acid copolymer obtained in Example 5, an aqueous dispersion was obtained in the same manner as in Example 5 by neutralizing 10% of methacrylic acid with sodium ions and residual 90% with ammonium ions. This dispersion had a solid content of 26%, viscosity of 20 c.p. and average particle diameter of 0.3 microns.

COMPARISON EXAMPLE 1

In a continuous complete mixing type autoclave of 15 liter inner volume with a ratio of depth/diameter of 3 were charged 800 kg/hour of ethylene, 14 kg/hour of methyl methacrylate and 60 ppm (based on ethylene, calculated as oxygen) of lauryl peroxide as catalyst. Polymerization was carried out under pressure of 2000 kg/cm$^2$ at a temperature of 200° C. to a conversion of 10% based on the total weight of ethylene and methyl methacrylate. The resultant ethylene/methyl methacrylate contained 5.7 mol % of methyl methacrylate with melt index of 85 g/10 min. and $\overline{C}_n/\overline{C}_w=0.97$. The curve of the integrated composition distribution of the acidic units of this copolymer is shown in FIG. 1. Using this copolymer, partially neutralized ethylene/methacrylic acid copolymer in which 33% of methacrylic acid was neutralized with sodium ions was prepared in the same manner as in Example 1.

Then, according to a procedure similar to Example 1, an aqueous dispersion was prepared from this copolymer. But the resultant dispersion was poor in stability and separation occurred after standing for overnight.

COMPARISON EXAMPLE 2

The ethylene/methyl methacrylate copolymer prepared in Comparison example 1 was converted to ethylene/methacrylic acid copolymer in the same manner as in Example 5. Then, similarly as in Example 5, an aqueous dispersion with solid content of 24%, viscosity of 30 c.p. and average particle diameter of 0.3 micron was prepared. In this dispersion, 30% of methacrylic acid was neutralized with sodium ions and 4.8% (based on solid weight) of sodium oleate was contained.

COMPARISON EXAMPLE 3

According to the same procedure as described in Example 1 except that 13.0 kg/hour of ethylene and 0.68 kg/hour of methyl methacrylate were used and the conversion based on the total weight of ethylene and methyl methacrylate was 28%, there was prepared an ethylene/methyl methacrylate copolymer containing 5.8 mol % of methyl methacrylate with $\bar{C}_n/\bar{C}_w=0.45$ and melt index of 62 g/10 min. Then, ethylene/methacrylic acid copolymer was prepared in the same manner as in Example 5 except that the amount of caustic soda added was 10.8 g and that of 50 wt. % sulfuric acid 28.4 g. By using this copolymer an aqueous dispersion in which 30% of methacrylic acid was neutralized with sodium ions having solid content of 25%, viscosity of 50 c.p. and average particle diameter of 0.3 micron was obtained according to the same method as in Example 5.

COMPARISON EXAMPLE 4

Using the ethylene/methyl methacrylic acid copolymer obtained in Comparison example 2, there was prepared an aqueous dispersion in which 10% of methacrylic acid was neutralized with sodium ions and residual 90% with ammonium ions according to the same method as in Example 6. This dispersion had a solid content of 23%, viscosity of 25 c.p. and average particle diameter of 0.4 micron.

COMPARISON EXAMPLE 5

By the method similar to Comparison example 1, an ethylene/methyl methacrylate copolymer containing 9.8 mol % of methyl methacrylate with $\bar{C}_n/\bar{C}_w=0.98$ and melt index of 110 g/10 min. was prepared. Then, according to the same procedure as in Comparison example 1 except that the amount of caustic soda added was 15.1 g and that of 50 wt. % sulfuric acid 32.5 g, there was obtained a partially neutralized ethylene/methacrylic acid copolymer in which 35% of methacrylic acid was neutralized with sodium ions. Using this copolymer, according to the same method as in Example 4, an aqueous dispersion was obtained. This dispersion had a solid content of 24%, viscosity of 40 c.p. and average particle diameter of 0.4 micron.

EXAMPLE 7

Each of the aqueous dispersions prepared in Examples 1, 2, 3 and 6 and Comparison examples 2 through 4 was coated uniformly on a glass plate in thickness of dried film of 7 to 10 microns. Films were formed by varying the temperature and the state of the films formed were observed. The results are shown in Table 1. The films formed at 150° C. of Example 1 and Comparison example 2 were photographed to give the results as shown in microphotographs 1 and 2. (magnification ×10)

As apparently seen from Table 1, no continuous film can be formed at a considerably high temperature for $\bar{C}_n/\bar{C}_w>0.95$. On the other hand, for $\bar{C}_n/\bar{C}_w<0.5$, continuous film can be formed at 60° C. but the film is turbid. Within the range $0.5\leq\bar{C}_n/\bar{C}_w\leq0.95$, transparent continuous film can be formed at 40° C. to 80° C.

Table 1

|  | $\bar{C}_n/\bar{C}_w$ | Methacrylic acid content (mol %) | Degree of neutralization (%)* | Temperature at which films are formed | | | | | |
| --- | --- | --- | --- | --- | --- | --- | --- | --- | --- |
|  |  |  |  | 40° C. | 60° C. | 80° C. | 100° C. | 120° C. | 150° C. |
| Example 1 | 0.61 | 5.7 | 36 | with cracks | good | good | good | good | good |
| 2 | 0.85 | 5.8 | 32 | with cracks | good | good | good | good | good |
| 3 | 0.92 | 5.8 | 29 | with cracks | with cracks | good | good | good | good |
| Comparison example 2 | 0.97 | 5.7 | 30 | with cracks | with cracks | with cracks | with cracks | with cracks | with cracks |
| 3 | 0.45 | 5.8 | 30 | with cracks | turbid film | turbid film | turbid film | turbid film | turbid film |
| Example 6 | 0.61 | 5.7 | 10 (100) | with cracks | good | good | good | good | good |
| Comparison example 4 | 0.97 | 5.7 | 10 (100) | with cracks | with cracks | with cracks | with cracks | with cracks | with cracks |

*Degree of neutralization of —COOH with alkali metal ions, the values in the brackets indicating the total neutralization degree when neutralized with metal ions and/or ammonium ions

EXAMPLE 8

The aqueous dispersion obtained in Example 1 was double coated on an art paper base stock 75 g/m² in total amount of 10 g/m² and dried at 150° C. A uniform film was found to be formed on the paper. When this coating was heat sealed by means of Centinel Heat Sealer under conditions of 120° C., 2 kg/cm², one second, the peel-off strength was found to be 0.45 kg/15 mm. Peel-off test was performed by T-type peeling at 300 mm/minute. Furthermore, when penetration of mineral oil was tested at room temperature, no penetration of oil was observed after 30 days. On the other hand, when similar coating is applied by use of the aqueous dispersion of Comparison example 2, a film with many cracks was formed and mineral oil was readily penetrated therethrough.

EXAMPLE 9

The aqueous dispersion obtained in Example 1 was coated on an aluminum foil in amount of 10 g/cm² and dried at 120° C. whereby a transparent and uniform continuous film was found to be formed on the aluminum foil. Peel-off strength after heat sealing by means of Centinel Heat Sealer under conditions of 120° C., 2 kg/cm² and one second 0.80 kg/15 mm by the same test method as in Example 8.

For comparison, the aqueous dispersion obtained in Comparison example 2 was coated in 10 g/cm² on aluminum foil and dried at 120° C., whereby only a film with many cracks was formed.

EXAMPLE 10

The aqueous dispersion obtained in Example 4 was coated on an aluminum foil in amount of 10 g/cm² and dried at 120° C. A transparent and uniform continuous film was found to be formed on the aluminum foil. Peel-off strength of this coating was measured by T-type peel-off at 300 mm/minute after heat sealing by means of Centinel Heat Sealer under conditions of 120° C., 2 kg/cm² and one second to be 1.13 kg/15 mm.

For comparison, the aqueous dispersion obtained in Comparison example 5 was used to carry out the same test to obtain a peel-off strength of 0.53 kg/15 mm.

EXAMPLE 11

The aqueous dispersion prepared in Example 1 was coated on a nylon film of 15μ in thickness on which an adhesive had previously been applied. As an adhesive, there was employed an isocyanate type adhesive comprising a 9:1 mixture of Takelac A-371 and Takenate A-3 (trade marks: Takeda Chemical Industries, Ltd., Japan) in an amount of 0.3 g/m². Said aqueous dispersion was coated on the adhesive in an amount of 5 g/m² and dried at 120° C. The coated surfaces were subjected to heat sealing face to face by means of Centinel Heat Sealer at 120° C. under a pressure of 2 kg/cm² for one second. The peel-off strength was measured to be 0.45 kg/15 mm by T-type peeling test at the rate of 300 mm/minute.

For comparative purpose, similar test was conducted by use of the aqueous dispersion obtained in Comparison example 3, whereby a turbid film was formed with peel-off strength of 0.28 kg/15 mm.

EXAMPLE 12

The aqueous dispersion obtained in Example 1 (100 g) was diluted with 890 g of water containing 0.025 g of a nonionic surfactant (Emulgen 985, trade mark: Kao-Atlas Co., Japan) under stirring, followed by further addition of 10 g of γ-aminopropyl triethoxy silane under stirring. The resultant composition for treatment of fibers exhibited no formation of precipitate but remained as a good dispersion even after standing at room temperature for one month. Then, into the above composition were dipped glass fibers subjected to sizing with water. The treated glass fibers, after drying at 130° C. in a hot air oven, were cut into pieces with 6 mm length. Thirty parts of the cut glass fibers and 70 parts of a high density polyethylene (Suntec J 240, trade mark: Asahi Kasei Kogyo Kabushiki Kaisha, Japan) were extruded at 230° C. through a uniaxial extruder. Using the thus formed pellets for molding, test pieces were injection molded for measurement of physical properties. The results are shown in Table 2.

For comparative purpose, a composition for treatment of fibers was prepared similarly by use of the aqueous dispersion prepared in Comparison example 2. But a great amount of precipitates were observed to be formed simultaneously with addition of γ-aminopropyl triethoxy silane. Accordingly, by increasing the amount of the nonionic surfactant to 4% based on the weight of said copolymer, under otherwise the same conditions in Example 12, a composition was prepared from the aforesaid dispersion. The thus prepared composition was less in amount of precipitates formed as compared with that with smaller amount of the surfactant. Treatment of glass fibers was conducted using this composition by the same method as in Example 12 and the treated glass fibers were blended with high-density polyethylene to give the results as shown in Table 2.

Table 2

| Copolymer | $\overline{C}_n/\overline{C}_w$ | Tensile strength (kg/cm²) | Flexural strength (kg/cm²) | Flexural modulus (kg/cm²) | Izod impact strength (notched; kg. cm/cm) | Heat distortion temperature (°C.) |
|---|---|---|---|---|---|---|
| Example 1 | 0.61 | 650 | 900 | 43,000 | 13.5 | 115 |
| Comparison example 2 | 0.97 | 480 | 610 | 38,000 | 8.0 | 108 |

EXAMPLE 13

To 2.5 liters of water was added 500 g of quick lime to prepare a slurry of slated lime and carbon dioxide gas was injected thereinto until pH of the slurry was 7 to prepare precipitated calcium carbonate. Then, the temperature of the product was raised to 80° C. and 120 g of the aqueous dispersion obtained in Example 5 was added thereto, followed by filtration and drying to obtain coated precipitated calcium carbonate. The coated precipitated calcium carbonate was compounded with ethylene/propylene/ethylidene norbornene copolymer (EPDM) (EPT 3045, Mitsui Polychemical Co., Japan) according to the formulations set forth below and the compound was subjected to press vulcanization at 160° C. for 30 minutes.

| EPDM formulation | |
|---|---|
| Mitsui EPT 3045 | 100 parts |
| zinc oxide | 5 |
| stearic acid | 1 |
| tetramethylthiuram monosulfide | 1.5 |
| 2-mercapto benzothiazole | 0.5 |
| sulfur | 1.5 |
| calcium carbonate | 100 |

Similarly, the above procedure was repeated by adding 0.3 g of γ-aminopropyl triethoxy silane together with the aqueous dispersion and also, for comparative purpose, precipitated calcium carbonate without the above treatment was formulated in the same manner as described above. Measurement of physical properties of these formulations were carried out according to the method of JIS K-6301 to obtain the results as shown in Table 3.

Table 3

| Coating material | Tensile strength (kg/cm$^2$) | Elongation (%) |
|---|---|---|
| Aqueous dispersion of the invention | 69 | 510 |
| Aqueous dispersion of the invention + Organic silane | 98 | 630 |
| Control | 34 | 300 |

EXAMPLE 14

A fabric made of nylon 66 fibers was immersed in the aqueous dispersion obtained in Example 1 to uniformly adhere said dispersion to the fabric. After preliminary drying at 80° C., the fabric was further heated at 200° C. for 3 minutes. The thus treated nylon fabric was adhered to ethylene/vinyl acetate copolymer (EVA) (Evaflex 460, trade mark, Mitsui Polychemical Co., Japan) with heating at 200° C. under pressure of 4.2 kg/cm$^2$ for 25 seconds. Peel-off test was conducted by T-type peel-off method at the rate of 50 mm/minute using a tension tester. The result is shown in Table 4. For comparison, the same test was conducted for nylon 66 fabric which has not been treated with the aqueous dispersion to give the result as shown in the same Table.

EXAMPLE 15

Example 14 was repeated except that cotton fabric was used in place of nylon 66 fabric. The results are also shown in Table 4.

Table 4

| | Fabric | Treatment | Peel-off strength (kg/cm) |
|---|---|---|---|
| Example 14 | Nylon 66 | treated | 1.5 |
| | " | not treated | 0.4 |
| Example 15 | Cotton | treated | 1.7 |
| | " | not treated | 0 |

As apparently seen from the above Examples, the aqueous dispersion of ethylenic copolymer having specific composition distribution is excellent in film-forming property and very useful for coating of various substrates.

What we claim is:

1. An aqueous dispersion for coating comprising a partially neutralized copolymer comprising from 99 to 75 mol % of ethylene and from 1 to 25 mol % of α,β-ethylenically unsaturated carboxylic acid of which at least 10% is neutralized with metallic and/or ammonium ions, wherein the improvement comprises using the partially neutralized copolymer of ethylene and α,β-ethylenically unsaturated carboxylic acid having a composition distribution of the acidic units within the range from 0.50 to 0.95 in terms of the ratio of the reciprocal of the minus first-order moment of the distribution of the acidic units to the plus first-order moment of the distribution of the acidic units.

2. An aqueous dispersion as in claim 1, wherein the copolymer comprises from 98 to 90 mol % of ethylene and from 2 to 10 mol % of α,β-ethylenically unsaturated carboxylic acid.

3. An aqueous dispersion as in claim 1, wherein α,β-ethylenically unsaturated carboxylic acid is acrylic acid, methacrylic acid, fumaric acid, itaconic acid or maleic acid.

4. An aqueous dispersion as in claim 1, wherein the ratio of the reciprocal of the minus first-order moment of the distribution of the acidic units to the plus first-order moment of the distribution of the acidic units is from 0.60 to 0.90.

5. An aqueous dispersion as in claim 1, wherein the neutralization metal is sodium, potassium or lithium.

6. An aqueous dispersion as in claim 1, wherein 20 to 50% of α,β-ethylenically unsaturated carboxylic acid is neutralized with sodium ions.

7. An aqueous dispersion as in claim 1, wherein at least 20% of α,β-ethylenically unsaturated carboxylic acid is neutralized with ammonium ions.

8. An aqueous dispersion as in claim 1, wherein from 1 to 20% of α,β-ethylenically unsaturated carboxylic acid is neutralized with sodium ions and from 9 to 99% of α,β-ethylenically unsaturated carboxylic acid is neutralized with ammonium ions.

9. An article of manufacture prepared by coating a substrate with an aqueous dispersion comprising a partially neutralized copolymer comprising from 99 to 75 mol % of ethylene and from 1 to 25 mol % of α,β-ethylenically unsaturated carboxylic acid of which at least 10% is neutralized with metallic and/or ammonium ions, wherein the improvement comprises using the partially neutralized copolymer of ethylene and α,β-ethylenically unsaturated carboxylic acid having a composition distribution of the acidic units within the range from 0.50 to 0.95 in terms of the ratio of the reciprocal of the minus first-order moment of the distribution of the acidic units to the plus first-order moment of the distribution of the acidic units.

10. An article of manufacture as in claim 9, wherein the substrate is made of aluminum.

11. An article of manufacture as in claim 10, wherein the substrate is aluminum foil or aluminum can.

12. An article of manufacture as in claim 9, wherein the substrate is made of glass.

13. An article of manufacture as in claim 12, wherein the substrate is glass fiber, glass bottle or glass plate.

14. An article of manufacture as in claim 9, wherein the substrate is made of talc or calcium carbonate.

15. An article of manufacture as in claim 9, wherein the substrate is made of polyamide, polypropylene, polyester, polystyrene, polyethylene, polyvinylalcohol or polyvinylidene chloride.

16. An article of manufacture as in claim 15, wherein the substrate is a film, a sheet, a bottle or a tube of polyamide, polypropylene, polyester, polystyrene, polyethylene, polyvinylalcohol or polyvinylidene chloride.

17. An article of manufacture as in claim 15, wherein the substrate is fiber or a fabric of polyamide, polypropylene, polyester or polyvinylalcohol.

18. An article of manufacture as in claim 9, wherein the substrate is paper or cellulosic material.

19. An article of manufacture as in claim 18, wherein the cellulosic material is ethyl cellulose, cellulose acetate, cellulose propionate, cellulose acetate butyrate or cellulose nitrate.

* * * * *